US012675106B2

(12) United States Patent
Feng et al.

(10) Patent No.: US 12,675,106 B2
(45) Date of Patent: Jul. 7, 2026

(54) MULTI-SENSOR PERCEPTION FOR RESOURCE TRACKING AND QUANTIFICATION

(71) Applicant: PepsiCo, Inc., Purchase, NY (US)

(72) Inventors: Ying Feng, The Colony, TX (US);
Jingting Hui, Chicago, IL (US);
Matthew Torres, Plano, TX (US)

(73) Assignee: PepsiCo, Inc., Purchase, NY (US)

( * ) Notice: Subject to any disclaimer, the term of this patent is extended or adjusted under 35 U.S.C. 154(b) by 803 days.

(21) Appl. No.: 17/727,207

(22) Filed: Apr. 22, 2022

(65) Prior Publication Data

US 2023/0341847 A1      Oct. 26, 2023

(51) Int. Cl.
*G05D 1/00*          (2024.01)
(52) U.S. Cl.
CPC ......... *G05D 1/0022* (2013.01); *G05D 1/0027* (2013.01); *G05D 1/0094* (2013.01)
(58) Field of Classification Search
CPC .. G05D 1/0022; G05D 1/0027; G05D 1/0094; G06Q 10/0833; G06V 20/52
See application file for complete search history.

(56) References Cited

U.S. PATENT DOCUMENTS

| | | | | |
|---|---|---|---|---|
| 10,384,869 | B1 * | 8/2019 | Shiee | H04N 23/951 |
| 11,250,456 | B2 * | 2/2022 | Schumacher | H02S 40/38 |
| 11,361,278 | B2 * | 6/2022 | Dattamajumdar | A61G 12/001 |
| 11,481,571 | B2 * | 10/2022 | Kiemele | G06V 40/10 |
| 12,032,430 | B1 * | 7/2024 | Ren | G06F 11/3003 |
| 2007/0285241 | A1 * | 12/2007 | Griebenow | G06Q 50/40 |
| | | | | 340/572.1 |
| 2012/0235791 | A1 * | 9/2012 | Donlan | G06Q 10/0833 |
| | | | | 340/10.1 |
| 2017/0286773 | A1 | 10/2017 | Skaff et al. | |
| 2018/0088586 | A1 * | 3/2018 | Hance | G06Q 10/08 |

(Continued)

OTHER PUBLICATIONS

International Search Report and Written Opinion in counterpart International Application No. PCT/US23/18964, mailed Jul. 21, 2023, 6 pages.

(Continued)

*Primary Examiner* — Michael Jared Walker
(74) *Attorney, Agent, or Firm* — Sterne, Kessler, Goldstein & Fox P.L.L.C.

(57) ABSTRACT

Disclosed herein are system, method, and computer program product embodiments for multi-sensor perception for resource tracking and quantification. An embodiment operates by receiving resource information indicating a resource identifier, a resource location, and a resource amount. Based on sensor data received from a first sensing device and the resource identifier, a resource removed from the resource location and placed at a predefined location may be tracked. An amount of the resource placed at the predefined location may be determined based on depth information from sensor data received from a second sensing device. A notification that indicates that additional resources that match the resource should stop being removed from the resource location and placed at the predefined location may be generated based on a match between the resource amount and the amount of the resource placed at the predefined location.

21 Claims, 7 Drawing Sheets

(56)      References Cited

U.S. PATENT DOCUMENTS

| | | | | |
|---|---|---|---|---|
| 2019/0265714 | A1* | 8/2019 | Ball | ......................... G06N 3/08 |
| 2020/0118154 | A1* | 4/2020 | Schumacher | ...... G06Q 30/0223 |
| 2020/0122835 | A1* | 4/2020 | Daw Perez | .............. B64C 1/20 |
| 2020/0410433 | A1* | 12/2020 | Rahilly | ............. B65D 21/0213 |
| 2021/0124941 | A1* | 4/2021 | Mirza | ................... G06V 20/52 |
| 2021/0216952 | A1* | 7/2021 | Schumacher | .......... G06V 20/52 |
| 2021/0304122 | A1* | 9/2021 | Dattamajumdar | ..... G16H 40/20 |
| 2021/0407131 | A1 | 12/2021 | Kallakuri et al. | |
| 2022/0051179 | A1 | 2/2022 | Savvides et al. | |
| 2022/0121852 | A1 | 4/2022 | Curtis et al. | |
| 2022/0180720 | A1* | 6/2022 | Tyler | ................. G08B 13/2462 |
| 2022/0261752 | A1* | 8/2022 | Gathman | .......... G06Q 10/0833 |
| 2022/0391616 | A1* | 12/2022 | Tsui | ...................... G06V 20/58 |
| 2023/0341847 | A1* | 10/2023 | Feng | ................... G05D 1/0022 |
| 2024/0219518 | A1* | 7/2024 | Peterson | .................. G01S 7/40 |
| 2024/0265342 | A1* | 8/2024 | Prasad | ................. G06V 20/44 |

OTHER PUBLICATIONS

Supplemental European Search Report for EP application No. 23792432.9, European Patent Office, mailed on Sep. 12, 2025, 9 Pages.

* cited by examiner

100

Computing Device
102

Interface Module
106

Storage Module
108

Sensing Module
110

Analysis Module
112

104

120

104

400

410 Determine Data

420 Generate Training Data And Testing Data

430 Determine Features

440 Train Machine Learning Model

450 Perform Optimization And Cross Validation

460 Build Predictive Engine

470 Classification And Predicted Values

480 Reached Accuracy Level?

No yes

490 Output Predictive Engine

500

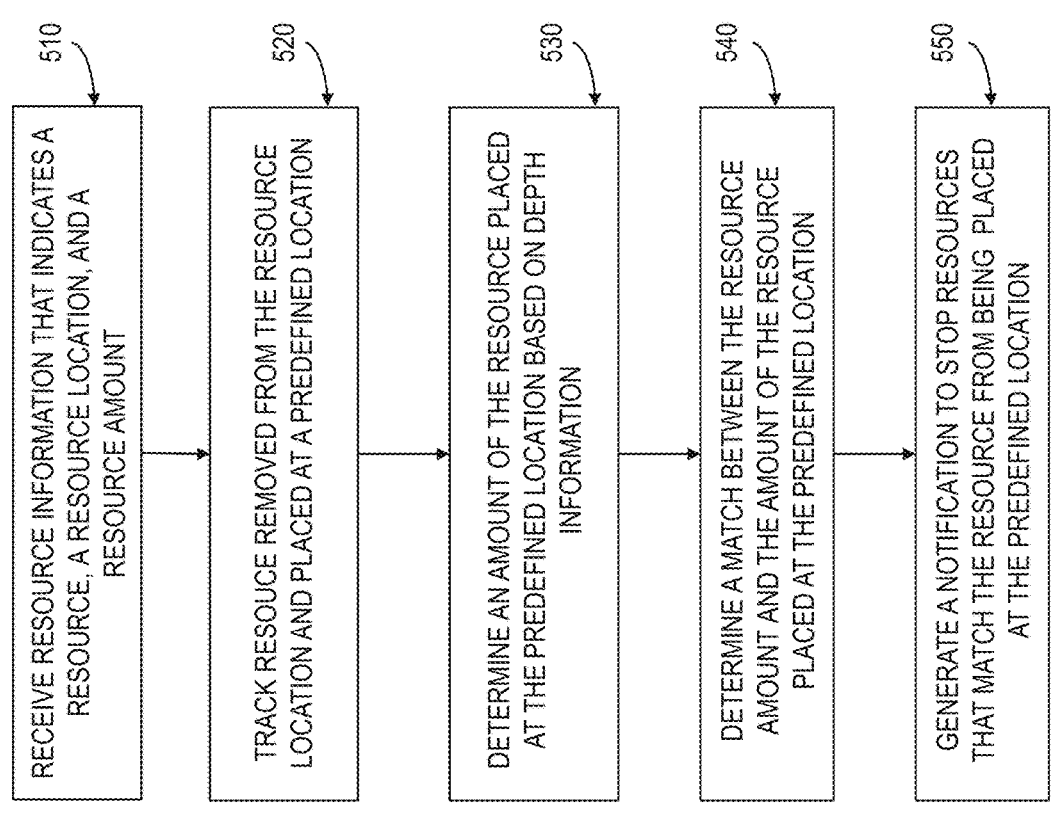

510 RECEIVE RESOURCE INFORMATION THAT INDICATES A RESOURCE, A RESOURCE LOCATION, AND A RESOURCE AMOUNT

520 TRACK RESOUCE REMOVED FROM THE RESOURCE LOCATION AND PLACED AT A PREDEFINED LOCATION

530 DETERMINE AN AMOUNT OF THE RESOURCE PLACED AT THE PREDEFINED LOCATION BASED ON DEPTH INFORMATION

540 DETERMINE A MATCH BETWEEN THE RESOURCE AMOUNT AND THE AMOUNT OF THE RESOURCE PLACED AT THE PREDEFINED LOCATION

550 GENERATE A NOTIFICATION TO STOP RESOURCES THAT MATCH THE RESOURCE FROM BEING PLACED AT THE PREDEFINED LOCATION

FIG. 5

Computer System 600

MULTI-SENSOR PERCEPTION FOR RESOURCE TRACKING AND QUANTIFICATION

BACKGROUND

Economic growth in industries such as e-commerce has revealed unexpected inventory management challenges. Inventory inaccuracies cause issues, such as inaccurate resource (e.g., item, product, element, etc.) deliveries, that impact customer service levels and erode profit margins. Pallets are routinely used to package, transport, and manage resources/products. Conventionally, pallet building processes that require entities (e.g., product/resource pickers, warehouse laborers, autonomous/semi-autonomous robots/ devices, etc.) to manually build each pallet based on a purchase order are labor-intensive. Entities often must manually count and track resource/product identifiers (e.g., stock keeping units (SKUs), etc.) as resources/products are placed on pallets. The manual process is often error-prone and results in inaccurate pallets being sent to the consumer, businesses, and/or the like. This can prompt costly corrective measures to be taken. Further, poorly packed pallets may cause injury and/or bodily harm from falling resources/ products.

BRIEF DESCRIPTION OF THE DRAWINGS

The accompanying drawings, which are incorporated herein and form a part of the specification, illustrate the present disclosure and, together with the description, further serve to explain the principles thereof and to enable a person skilled in the pertinent art to make and use the same.

FIG. 5 shows a flowchart of an example method for multi-sensor perception for resource tracking and quantification, according to some aspects.

DETAILED DESCRIPTION

Figure 1:
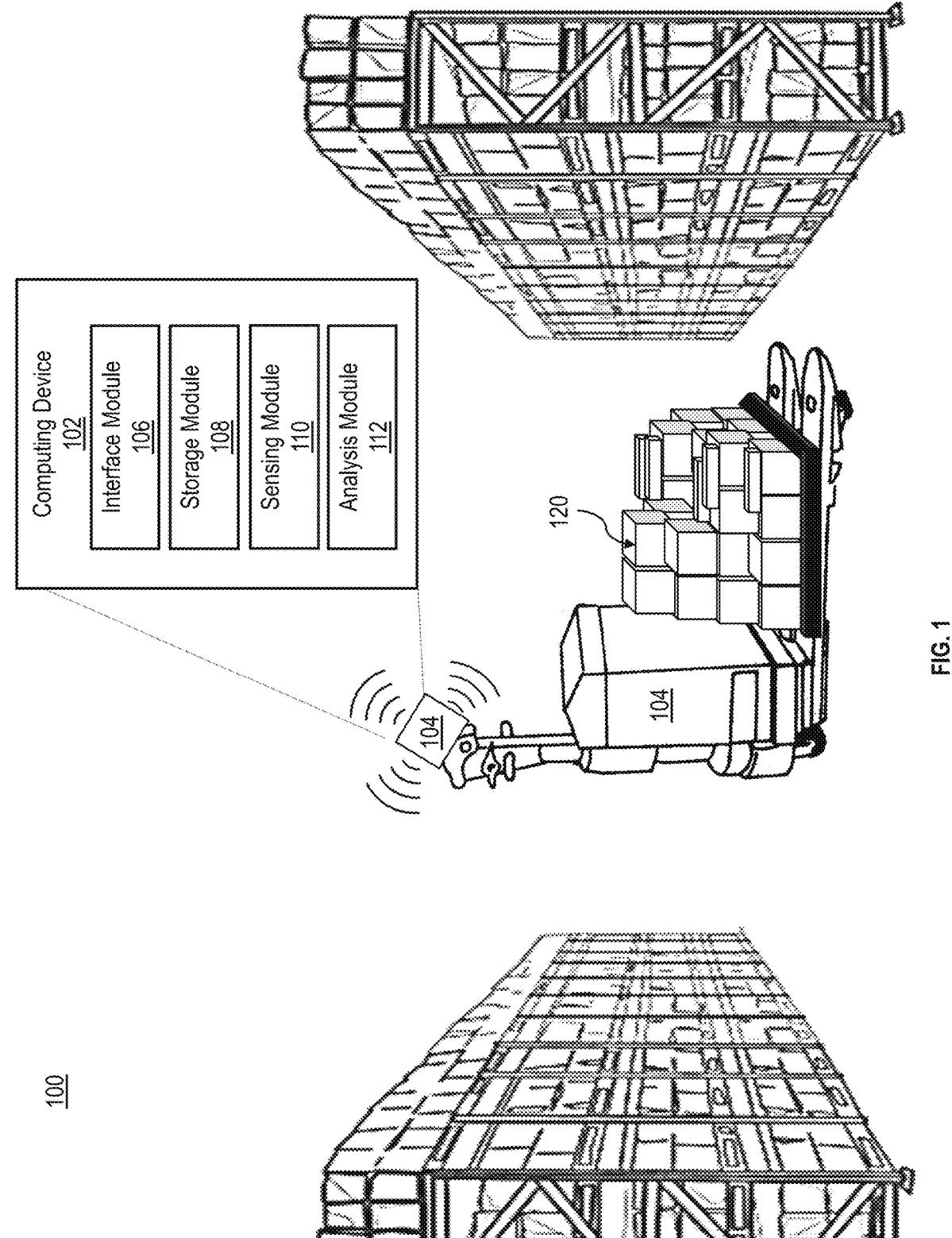
FIG. 1 shows an example system for multi-sensor perception for resource tracking and quantification, according to some aspects.

Provided herein are example systems, apparatuses, devices, methods, computer program product embodiments, and/or combinations and sub-combinations thereof for multi-sensor perception for resource tracking and quantification. A resource may include, for example, an item, a product, an element, a package, a device, and/or the like. According to some aspects, a computing device (e.g., a modular device, a stand-alone device, an Internet-of-Things (IoT) device, a warehouse management device, a resource management device, etc.) may be configured with and/or receive resource information indicating a respective identifier, a respective location, and a respective amount for each resource of a plurality of resources, such as resources within a warehouse setting and/or the like. Resource information may include, for example, purchase order information, warehouse slot mapping information, and/or the like. The computing device may include one or more sensing devices (e.g., imaging devices, cameras, Light Detection and Ranging (LIDAR) sensors, depth detection devices, etc.) positioned to capture sensor data (e.g., video, static images, image data, depth information, etc.) indicative of resources within its proximity. The one or more sensing devices may capture an entire resource retrieval process, including resource selection/picking and resource placement in predefined areas (e.g., on pallets, etc.). For example, the computing device may detect, track, and count resources as they are being placed on a pallet and identify any discrepancies with the resource information. The computing device may generate a notification that facilitates correction/verification of any identified discrepancies between resources placed on a pallet and the resource information. The notification may include an audible notification (e.g., text-to-speech, a recorded/computerized voice, a chime, an alarm, etc.), a text notification (e.g., a text message sent to a mobile device of a user, product/resource picker, warehouse laborer, etc.), a visual notification (e.g., a notification displayed on a user interface, etc.), and/or the like.

The systems, apparatuses, devices, methods, computer program product embodiments, and/or combinations and sub-combinations thereof for multi-sensor perception for resource tracking and quantification overcome various technological problems associated with conventional systems. For example, conventionally, inventory and/or resource management processes such as pallet building processes in warehouses and/or the like are labor-intensive—requiring each entity (e.g., product/resource picker, warehouse laborer, autonomous/semi-autonomous robot/device, etc.) to manually build each pallet according to a purchase order by manually identifying and counting resources placed on the pallet. The manual process results in inaccurate pallet build, depreciated user experiences, lost revenue due to inaccuracies in inventory and product shipping/sales, and/or the like. For example, industry analysts advise that more than two billion pallets are in circulation at any given time in the United States and resource inaccuracies in pallet build cause an average of over 40 million in lost revenue each year. Conventional inventory and/or resource management processes are unable to accurately identify, track, and quantify, resources, for example, within a warehouse setting and/or the like. For example, conventional inventory and/or resource management processes that use radio frequency identification (RFID), near field communication (NFC), and/or the like required tracking devices (e.g., RFID transmitters, NFC transmitter, etc.) are cumbersome, requiring costly tracking devices to be attached to each resource in inventory, and may output inaccurate information due to wireless interference, obscured components, and/or the like.

The systems, apparatuses, devices, methods, computer program product embodiments, and/or combinations and sub-combinations thereof for multi-sensor perception for resource tracking and quantification overcome issues relating to accurately identifying, tracking, and quantifying, resources, for example, within a warehouse setting and/or the like by using a sensor data (e.g., high-resolution imaging data, depth detection data) in combination with a trained analysis module (e.g., machine learning model, recognition model, etc.). The trained analysis module uses not only resource identification information but also resource-specific depth and location information from the sensor data to greatly reduce the possibility of resource misidentification and significantly improves the accuracy of resource, tracking, counting, and placement (to avoid damage to the resource and/or harm to an entity, etc.) over conventional systems that implement manual methods or technological methods such as RFID tracking, NFC tracking, and/or the like. Since the trained analysis module uses sensor data captured from multiple views and representing different types of information relevant to a resource, the resource may be accurately identified, tracked, and quantified.

The systems, apparatuses, devices, methods, computer program product embodiments, and/or combinations and sub-combinations thereof for multi-sensor perception for resource tracking and quantification described herein provide improvement to computer vision technology to identify, track, and quantify, resources, for example, within a warehouse setting and/or the like, while eliminating the need for procedures such as scanning and logging resources. The systems, apparatuses, devices, methods, computer program product embodiments, and/or combinations and sub-combinations thereof for multi-sensor perception for resource tracking and quantification described herein to the field of inventory assessment and resource management by using sensor data to enable and/or facilitate accurate and efficient pallet building processes. For example, notifications of resource discrepancies generated in real-time facilitate expedited pallet correction/verification—which in turn improves the accuracy of each pallet build while also improving the rate at which accurate pallets of resources may be constructed. These and other technological advantages are described herein.

FIG. 1 shows a block diagram of an example system 100 for multi-sensor perception for resource tracking and quantification, according to some aspects. System 100 may include a computing device 102 (e.g., a modular device, a stand-alone device, an Internet-of-Things (IoT) device, a warehouse management device, a resource management device, etc.) and a mobile unit 104 (e.g., a pallet truck, a forklift, a stocking cart, vehicle, fully or partially autonomous vehicle, etc.).

According to some aspects, the computing device 102 may be attached to the mobile unit 104 to facilitate accurate and efficient tracking of the location and quantities of resources via multi-sensor perception, such as resources included within pallet building processes. For example, the computing device 102 and mobile unit 104 may operate, for example, within a warehouse setting and/or the like to reduce and/or eliminate discrepancies in resources requested/order vs resources picked/palleted.

According to some aspects, the computing device 102 may include an interface module 106. The interface module 106 may be any interface for presenting and/or receiving information to/from a user, such as resource information and/or the like. Resource information may include, for example, purchase order information, warehouse slot mapping information, and/or the like. The interface module 106 may include a graphical user interface (GUI) and/or a communication interface such as a web browser (e.g., Microsoft Internet Explorer®, Mozilla Firefox®, Google Chrome®, Apple Safari®, etc.). Other software, hardware, and/or interfaces may be used to provide communication between the computing device 102 and a user (e.g., a product/resource picker, a warehouse laborer, etc.), other computing devices 102, warehouse management systems, and/or the like.

According to some aspects, the interface module 110 may include one or more input devices and/or components, for example, such as a keyboard, a pointing device (e.g., a computer mouse, remote control), a microphone, a joystick, a tactile input device (e.g., touch screen, gloves, etc.), and/or the like. According to some aspects, interaction with the input devices and/or components may enable a user to view, visit, access, request, and/or navigate to information regarding resources, such as purchase order information, warehouse slot mapping information, and/or the like that indicates identifiers (e.g., SKUs, universal product codes (UPCs), unique identifiers, etc.), locations (e.g., warehouse inventoried locations, shelves, aisles, bins, etc.), and/or amounts (e.g., purchase order amounts, stock amounts, requested amounts, etc.) for resources 120 (e.g., beverages, stock/inventory resources, products, etc.) within a warehouse, resource storage area, facility, and/or the like.

According to some aspects, the computing device 102 may include a storage module 108. According to some aspects, the storage module 108 may be loaded and/or configured with purchase order information, warehouse slot mapping information, and/or the like that indicates identifiers (e.g., SKUs, UPCs, unique identifiers, etc.), locations (e.g., warehouse inventoried locations, shelves, aisles, bins, etc.), and/or amounts (e.g., purchase order amounts, stock amounts, requested amounts, etc.) for resources (e.g., beverages, stock/inventory resources, products, etc.) within a warehouse and/or the like. Although not shown, according to some aspects, the computing device 102 may receive purchase order information, warehouse slot mapping information, and/or the like that indicates identifiers, locations, and/or amounts for resources within a warehouse and/or the like from a device (e.g., a cloud-based device, a service provider device, a computing device, etc.), a network (e.g., a private network, a public network, the Internet, etc.), a system (a warehouse management system, etc.), and/or the like. The computing device 102 may receive and store (e.g., via the storage module 108, etc.) resource information by any method or technique.

According to some aspects, the computing device 102 may include a sensing module 110. According to some aspects, to facilitate multi-sensor perception to track the locations and quantities of resources, the computing device 102 may receive different types of data/information from different sensing devices of the sensing module 110. The different types of data/information received from the sensing devices of the sensing module 110 may be analyzed separately, collectively, and/or the like. According to some aspects, the sensing module 110 may include one or more sensing devices, such as cameras (e.g., stereo cameras, high-definition cameras, video cameras, smart cameras, power-over-ethernet (PoE) cameras, etc.), LIDAR sensors, infrared sensors, position detection sensor, depth sensors, and/or the like. For example, according to some aspects, an arrangement of the sensing module 110 may include three cameras, such as two stereo cameras and a LIDAR camera. According to some aspects, the sensing module 110 may include any number and/or type of sensing device. The sensing module 110 may capture sensor data (e.g., video, static images, spatial/depth information, etc. that provides a real-time and/or real-world representation of resources within a field of view (and/or detection) of the sensing module 110. For example, the sensing module 110 may capture an entire resource retrieval process, including resource selection/picking and resource placement in predefined areas (e.g., on pallets, etc.).

For example, the computing device 102 may track, at the respective location for each resource of the plurality of resources, each resource removed from the respective location and placed at the predefined location based on sensor data received from at least one sensing device and the respective identifier. According to some aspects, the predefined location may be on a pallet. For example, a resource may be a box, package, and/or the like of beverages (or any other product), and the computing device 102 may track the resource as it is removed from a location in a warehouse and placed on a pallet. According to some aspects, the pallet may be placed on and/or attached to a mobile unit (e.g., a pallet truck, a forklift, a stocking cart, etc.). According to some aspects, the sensing device may include one or more of a camera (e.g., stereo camera, high-definition camera, video camera, smart camera, PoE camera, etc.), a LIDAR sensor, an infrared sensor, a position detection sensor, and/or the like.

Figure 2A:
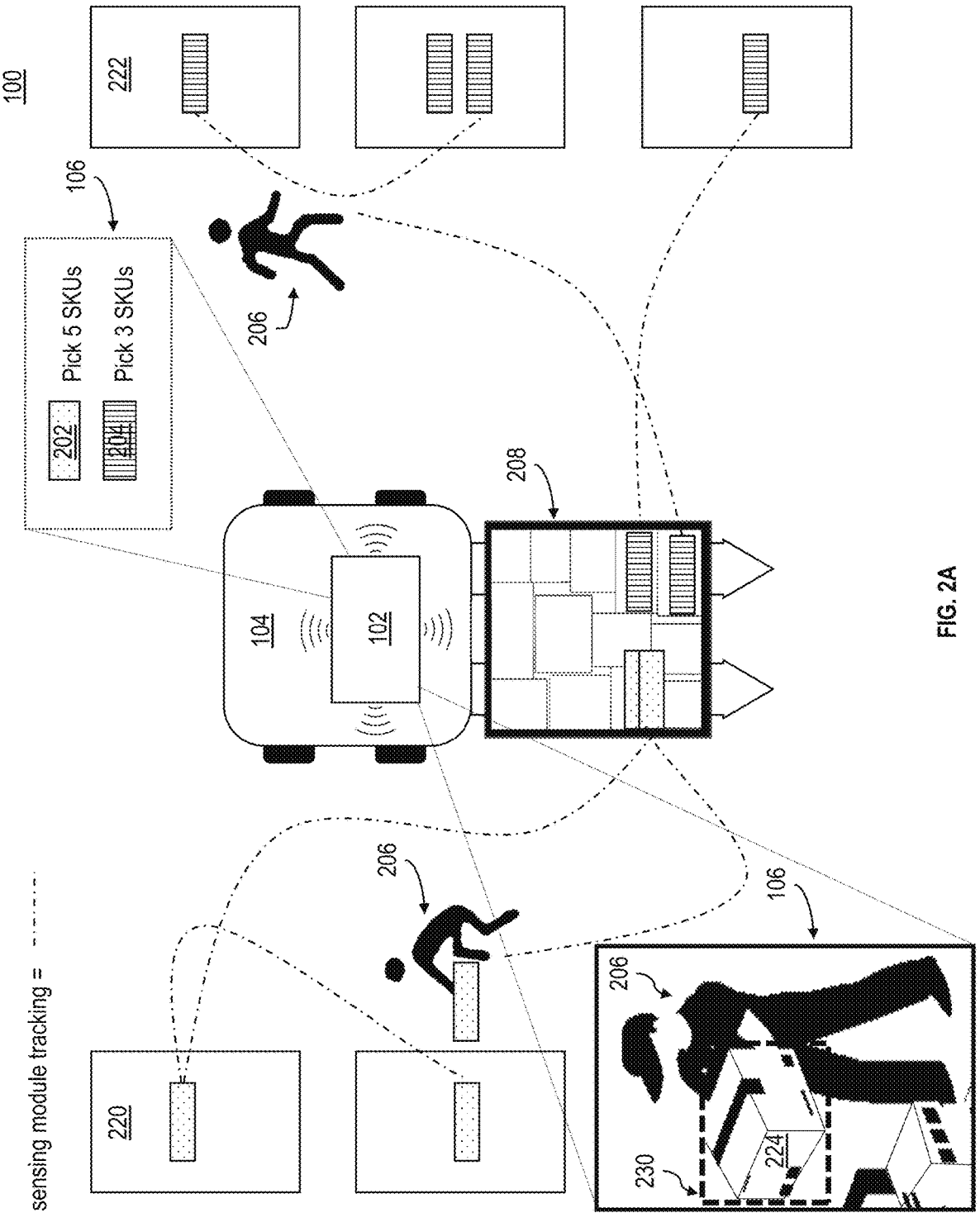
FIG. 2A shows an example system for multi-sensor perception for resource tracking and quantification, according to some aspects.

FIG. 2A shows an example of the system 100 of FIG. 1. As shown FIG. 2A, the computing device 102 (e.g., sensing module 110) may use sensor data to track resources 202 and 204 during a resource retrieval process performed by entities 206 (e.g., product/resource pickers, warehouse laborers, autonomous/semi-autonomous robots/devices, etc.), including resource selection/picking and placement of the resources 202 and 204 in a predefined area such as a pallet 208.

The computing device 102 may generate and/or display instructions for resource selection that is displayed via the interface module 106. For example, as depicted in FIG. 2A, the interface module 106 may display an amount (e.g., "pick 5," "pick 3," etc.) and identifier (e.g., SKUs) of each of the resources 202 and 204 the entities 206 are to select and place on the pallet 208. According to some aspects, the computing device 102 may generate instructions for resource selection that are output via an audible notification and/or sent to a user device (e.g., mobile device, smart device, computing terminal, etc.) of the entities 206.

According to some aspects, computing device 102 tracks each of the resources resource removed from specified locations for the resources, such as shelves 220 and 220, by determining, for each of the resources 202 and 204 removed from the respective location (e.g., shelves 220 and 220, etc.), that a type of the resource corresponds to a type of resource indicated by the respective identifier (e.g., the SKU indicated by the interface module 106, etc.). For example, computing device 102 may track each resource (e.g., resources 202 and 204, etc.) removed from the respective locations (e.g., shelves 220 and 220, etc.) and placed in a predefined location such as a pallet 208 by determining for each resource removed from the respective location, based on object recognition performed by a trained machine learning model, that a type of the resource corresponds to a type of resource indicated by the respective identifier.

For example, returning to FIG. 1, according to some aspects, the computing device 102 may include an analysis module 112. The analysis module 112 may be configured for object detection, object tracking, and/or the like. According to some aspects, the analysis module 112 may use artificial intelligence and/or machine learning, such as image/object recognition, to identify resources depicted by one or more images of a plurality of images, such as video frames, static images, and/or the like, included with the sensor data. For example, FIG. 2A shows the interface module 106 displaying an image of entity 206 selecting/picking a resource 224

(e.g., the resources 202 and 204, etc.) that is being tracked by image/object recognition (shown by bounding box 230, etc.), to identify resources depicted by one or more images of a plurality of images, such as video frames, static images, and/or the like, included with the sensor data. According to some aspects, the analysis module 112 may use one or more object identification and/or tracking algorithms to determine/detect resources in imaging/sensor data.

According to some aspects, the analysis module 112 may include a trained machine learning model, computer vision technology, and/or the like. The analysis module 112 may determine, for example, based on object tracking applied to sensor data received from the sensing module 110, that each resource (e.g., resources 202 and 204, etc.) is placed on the pallet 208. For example, the analysis module 112 may identify a resource (e.g., resources 202 and 204, etc.) in a first image of a plurality of images received from sensor data and generate a detection result. The analysis module 112 may track the resource by analyzing a second image of the plurality of images and the detection result from the first image by adjusting one or more locations of one or more bounding boxes associated with the resource in the second image to account for movement of the resource from one or more positions in the first image determined from the detection result. According to some aspects, the analysis module 112 may implement any object tracking method and/or technique.

Figure 2B:
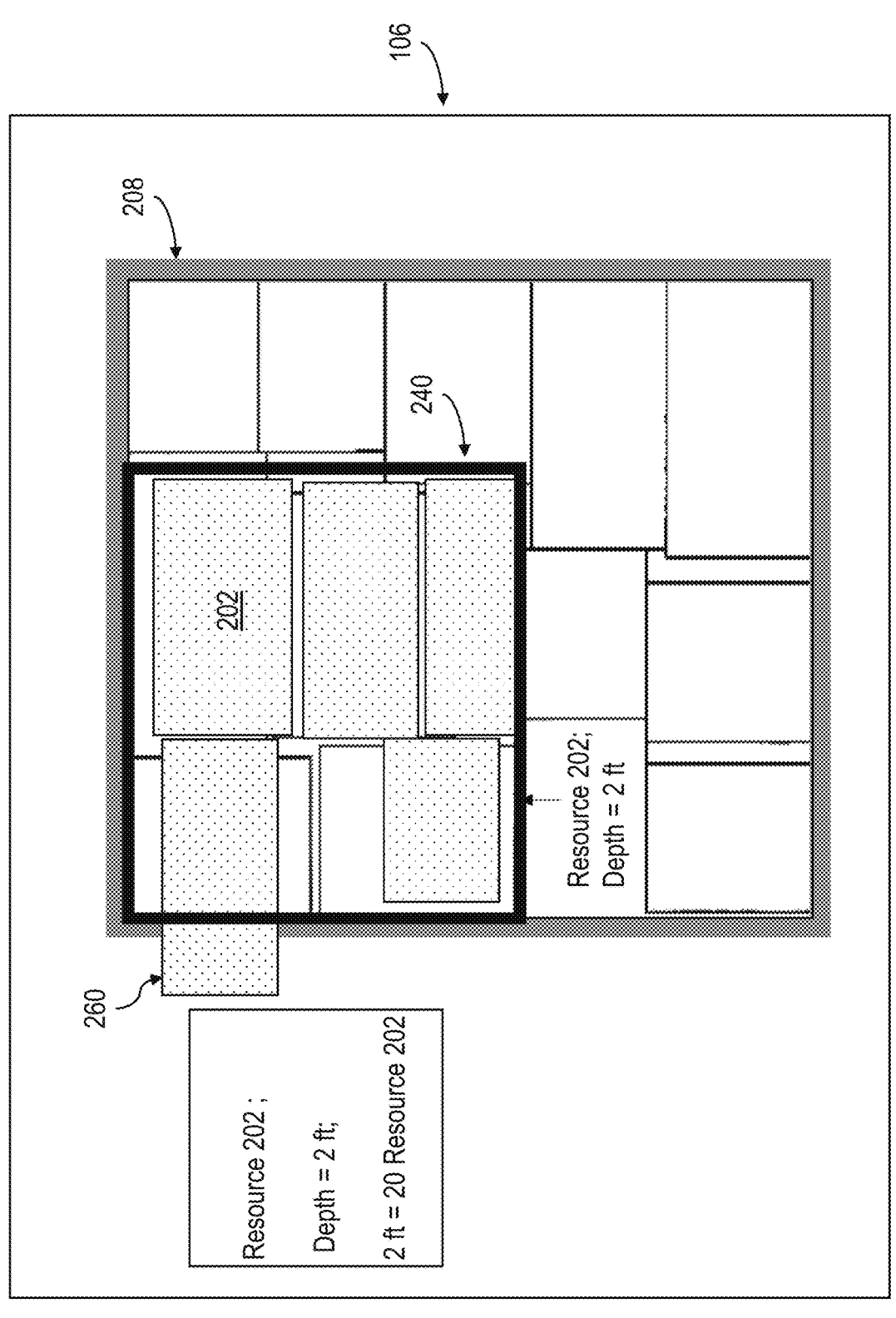
FIG. 2B shows an example display of a user interface used for multi-sensor perception for resource tracking and quantification, according to some aspects.

According to some aspects, the analysis module 112 may use depth information extracted from sensor data to determine an amount of a resource (e.g., resources 202 and 204, etc.) placed on the pallet 208 based on a match between a depth value indicated by the depth information and a depth value associated with an amount of the respective resource type. For example, FIG. 2B shows an example screen of the interface module 106. The computing device 102 may store resource information that details how many resources of a resource type are represented within a defined area based on a determined depth (e.g., stacking depth) of the resource arrangement. The imaging module 106 may display an image of resources placed on the pallet 208. The analysis module 112 may identify a resource type, such as resource 202, and display a bounding box 240 around a designated area on the pallet 208 for the resource. Information describing the contents of the bounding box 240 may be displayed. For example, as shown, an indication that the bounding box 240 surrounds resources 202 and a depth value (e.g., 2 ft., etc.) describing a distance from the sensing module 110 to the surface of the resources 202 and/or the like may be displayed. The analysis module 112 may determine an amount of the resource 202 based on a match between the indicated depth value and a depth value associated with an amount of the resource 202 indicated by resource information stored by the storage module 108.

According to some aspects, the analysis module 112 may use object recognition and/or object tracking to determine the orientation of resources placed on a pallet (e.g., the pallet 208, etc.) to ensure proper loading of the pallet and avoid damage to resources (e.g., resources 202 and 204, etc.) and/or entities (the entities 206, etc.). According to some aspects, as shown in FIG. 2B, a resource, such as resource 260 (or resource 202) may be placed on the pallet 208 without optimized positioning. For example, the analysis module 112 may detect that the shape of resource 260 extends outside of the bounding box 240. An extension of the resource 260 outside the bounding box 240 may cause resources placed/packed on the pallet 208 to be unbalanced, unstable, or without optimized spatial arrangement. The analysis module 112 may detect any misaligned and/or misplaced resources, such as the resource 260 extending outside the bounding box 240, and generate a notification to inform the entity 206. The notification may cause the entity 206 to repackage, replace, reorient, and/or optimize the packaging of the resource 260 placed on the pallet 208.

Figure 3:
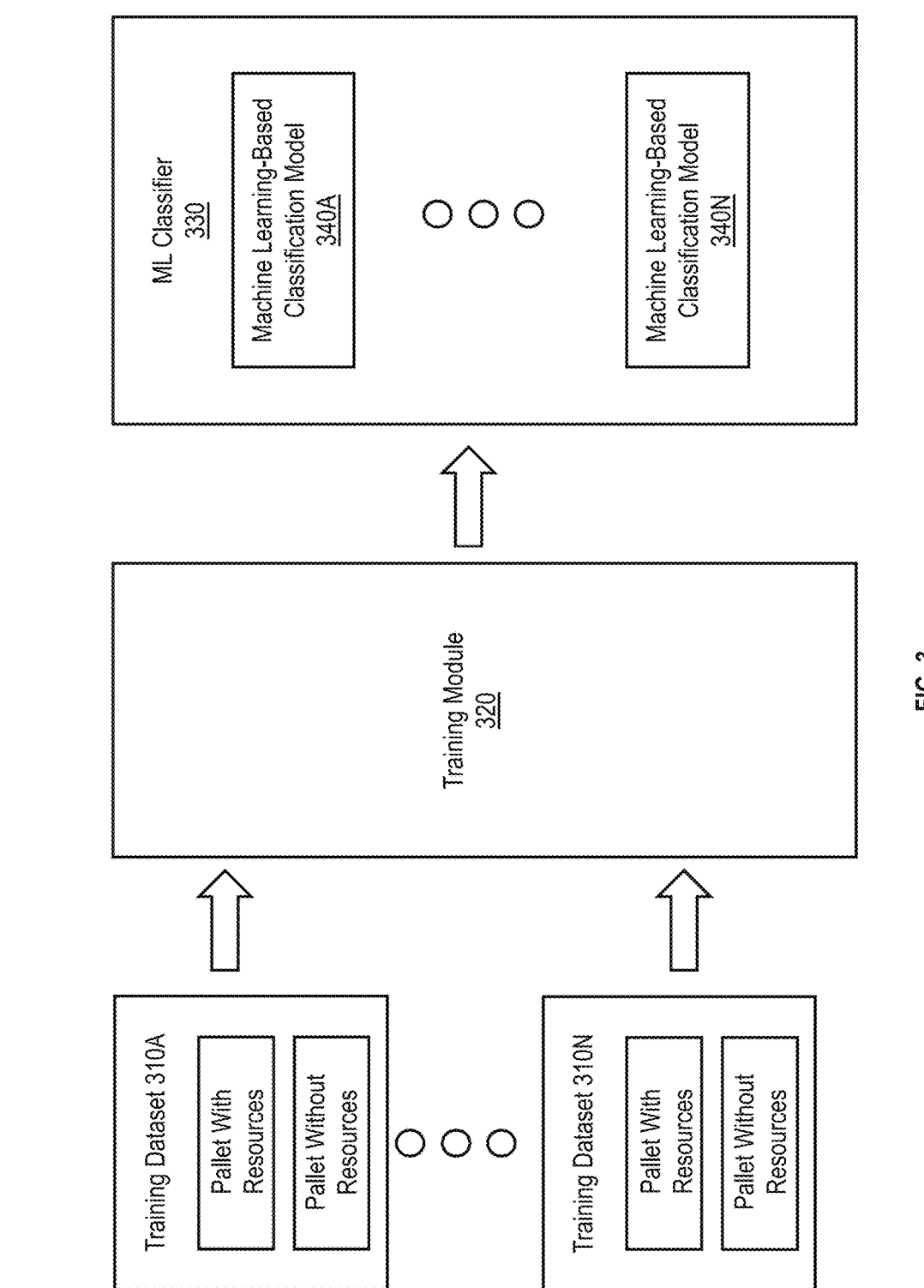
FIG. 3 shows an example system for training an analysis module that may be used for multi-sensor perception for resource tracking and quantification, according to some aspects.

FIG. 3 is an example system 300 for training the analysis module 112 for multi-sensor perception for resource tracking and quantification, according to some embodiments. FIG. 3 is described with reference to FIGS. 1-2. According to some aspects, the analysis module 112 may be trained to automatically detect, track, and count resources as being placed on a pallet. The analysis module 112 may be trained to identify any discrepancies found between resource information and resources (e.g., the resources 202 and 204 of FIG. 2A, etc.) placed on a pallet (e.g., the pallet 208 of FIG. 2A, etc.) and/or any other predefined location. The system 300 may use machine learning techniques to train at least one machine learning-based classifier 330 (e.g., a software model, neural network classification layer, etc.) that is configured to classify features extracted from sensor data, for example, such as sensor data received from the sensing module 110 of FIG. 1. The machine learning-based classifier 330 may be trained to classify features extracted from sensor data, for example, based on an analysis of one or more training datasets 310A-310N. The machine learning-based classifier 330 may classify features extracted from sensor data to identify resources and determine information about the resources such as resource type, placement location, optimal stacking orientations, misaligned resources when stacked and/or oriented together, resource count, and/or the like.

The one or more training datasets 310A-310N may comprise labeled baseline data such as labeled resource types (e.g., various shaped resources, bottles, cans, bowls, boxes, etc.) and/or labeled pallet packing scenarios (e.g., optimized stacking based on resource shape/design, resource placement locations, optimal stacking orientations, misaligned resources when stacked and/or oriented together, etc.). The labeled baseline data may include any number of feature sets (labeled data that identifies extracted features from sensor data, etc.).

The labeled baseline data may be stored in one or more databases. Data (e.g., sensor data, resource information, etc.) for multi-sensor perception for resource tracking and quantification may be randomly assigned to a training dataset or a testing dataset. According to some aspects, the assignment of data to a training dataset or a testing dataset may not be completely random. In this case, one or more criteria may be used during the assignment, such as ensuring that similar resource types, similar pallet packing scenarios, dissimilar resource types, dissimilar pallet packing scenarios, and/or the like may be used in each of the training and testing datasets. In general, any suitable method may be used to assign the data to the training or testing datasets.

The analysis module 112 may train the machine learning-based classifier 330 by extracting a feature set from the labeled baseline data according to one or more feature selection techniques. According to some aspects, the analysis module 112 may further define the feature set obtained from the labeled baseline data by applying one or more feature selection techniques to the labeled baseline data in the one or more training datasets 310A-310N. The analysis module 112 may extract a feature set from the training datasets 310A-310N in a variety of ways. The analysis module 112 may perform feature extraction multiple times, each time using a different feature-extraction technique. In some instances, the feature sets generated using the different techniques may each be used to generate different machine learning-based classification models 340. According to some aspects, the feature set with the highest quality metrics may be selected for use in training. The analysis module 112 may use the feature set(s) to build one or more machine learning-based classification models 340A-340N that are configured to determine and/or predict resource types, pallet packing scenarios, and/or the like.

According to some aspects, the training datasets 310A-310N and/or the labeled baseline data may be analyzed to determine any dependencies, associations, and/or correlations between resource types, pallet packing scenarios, and/or the like in the training datasets 310A-310N and/or the labeled baseline data. The term "feature," as used herein, may refer to any characteristic of a resource of data that may be used to determine whether the resource of data falls within one or more specific categories. For example, the features described herein may comprise resource types, pallet packing scenarios, and/or any other characteristics.

According to some aspects, a feature selection technique may comprise one or more feature selection rules. The one or more feature selection rules may comprise determining which features in the labeled baseline data appear over a threshold number of times in the labeled baseline data and identifying those features that satisfy the threshold as candidate features. For example, any features that appear greater than or equal to 2 times in the labeled baseline data may be considered as candidate features. Any features appearing less than 2 times may be excluded from consideration as a feature. According to some aspects, a single feature selection rule may be applied to select features or multiple feature selection rules may be applied to select features. According to some aspects, the feature selection rules may be applied in a cascading fashion, with the feature selection rules being applied in a specific order and applied to the results of the previous rule. For example, the feature selection rule may be applied to the labeled baseline data to generate information (e.g., an indication of a resource type, an indication of a pallet packing scenario, etc.) that may be used for multi-sensor perception for resource tracking and quantification. A final list of candidate features may be analyzed according to additional features.

According to some aspects, the analysis module 112 may generate information (e.g., an indication of a resource type, an indication of a pallet packing scenario, etc.) that may be used for multi-sensor perception for resource tracking and quantification operations may be based on a wrapper method. A wrapper method may be configured to use a subset of features and train the machine learning model using the subset of features. Based on the inferences that are drawn from a previous model, features may be added and/or deleted from the subset. Wrapper methods include, for example, forward feature selection, backward feature elimination, recursive feature elimination, combinations thereof, and the like. According to some aspects, forward feature selection may be used to identify one or more candidate resource types, pallet packing scenarios, and/or the like. Forward feature selection is an iterative method that begins with no feature in the machine learning model. In each iteration, the feature which best improves the model is added until the addition of a new variable does not improve the performance of the machine learning model. According to some aspects, backward elimination may be used to identify one or more candidate resource types, pallet packing scenarios, and/or the like. Backward elimination is an iterative method that begins with all features in the machine learning model. In each iteration, the least significant feature is removed until no improvement is observed on the removal of features. According to some aspects, recursive feature elimination may be used to identify one or more candidate resource types, pallet packing scenarios, and/or the like. Recursive feature elimination is a greedy optimization algorithm that aims to find the best performing feature subset. Recursive feature elimination repeatedly creates models and keeps aside the best or the worst performing feature at each iteration. Recursive feature elimination constructs the next model with the features remaining until all the features are exhausted. Recursive feature elimination then ranks the features based on the order of their elimination.

According to some aspects, one or more candidate resource types, pallet packing scenarios, and/or the like may be determined according to an embedded method. Embedded methods combine the qualities of filter and wrapper methods. Embedded methods include, for example, Least Absolute Shrinkage and Selection Operator (LASSO) and ridge regression which implement penalization functions to reduce overfitting. For example, LASSO regression performs L1 regularization which adds a penalty equivalent to an absolute value of the magnitude of coefficients and ridge regression performs L2 regularization which adds a penalty equivalent to the square of the magnitude of coefficients.

According to some aspects, one or more candidate resource types, pallet packing scenarios, and/or the like may be determined according to an ensemble method. Ensemble methods may combine outputs from separate classification models to produce a final decision regarding candidate resource types, pallet packing scenarios, and/or the like. According to some aspects, ensemble methods may include thresholding logic that evaluates each classification from a classification model to weight the influence of the classification model on a final classification result.

After analysis module 112 generates a feature set(s), the analysis module 112 may generate a machine learning-based predictive model 340 based on the feature set(s). Machine learning-based predictive model may refer to a complex mathematical model for data classification that is generated using machine-learning techniques. For example, this machine learning-based classifier may include a map of support vectors that represent boundary features. By way of example, boundary features may be selected from, and/or represent the highest-ranked features in, a feature set.

According to some aspects, the analysis module 112 may use the feature sets extracted from the training datasets 310A-310N and/or the labeled baseline data to build a machine learning-based classification model 340A-340N to determine and/or predict resource types, pallet packing scenarios, and/or the like. According to some aspects, the machine learning-based classification models 340A-340N may be combined into a single machine learning-based classification model 340. Similarly, the machine learning-based classifier 330 may represent a single classifier containing a single or a plurality of machine learning-based classification models 340 and/or multiple classifiers containing a single or a plurality of machine learning-based classification models 340. According to some aspects, the machine learning-based classifier 330 may also include each of the training datasets 310A-310N and/or each feature set extracted from the training datasets 310A-310N and/or extracted from the labeled baseline data. Although shown separately, analysis module 112 may include the machine learning-based classifier 330.

The extracted features from the imaging data may be combined in a classification model trained using a machine learning approach such as discriminant analysis; decision tree; a nearest neighbor (NN) algorithm (e.g., k-NN models, replicator NN models, etc.); statistical algorithm (e.g., Bayesian networks, etc.); clustering algorithm (e.g., k-means, mean-shift, etc.); neural networks (e.g., reservoir networks, artificial neural networks, etc.); support vector machines (SVMs); logistic regression algorithms; linear regression algorithms; Markov models or chains; principal component analysis (PCA) (e.g., for linear models); multi-layer perceptron (MLP) ANNs (e.g., for non-linear models); replicating reservoir networks (e.g., for non-linear models, typically for time series); random forest classification; a combination thereof and/or the like. The resulting machine learning-based classifier 330 may comprise a decision rule or a mapping that uses sensor data to determine and/or predict resource types, pallet packing scenarios, and/or the like. The resulting machine learning-based classifier 330 may include a family of compound-scaled object detection models trained using the imaging data, and may include simple functionality for Test Time Augmentation (TTA), model ensembling, hyperparameter evolution, and data export.

The sensor data and the machine learning-based classifier 330 may be used to determine and/or predict resource types, pallet packing scenarios, and/or the like for the test samples in the test dataset. For example, the result for each test sample may include a confidence level that corresponds to a likelihood or a probability that the corresponding test sample accurately determines and/or predicts resource types, pallet packing scenarios, and/or the like. The confidence level may be a value between zero and one that represents a likelihood that the determined/predicted resource types, pallet packing scenarios, and/or the like are consistent with a computed value. Multiple confidence levels may be provided for each test sample and each candidate (approximated) resource types, pallet packing scenarios, and/or the like. A top-performing candidate resource type, pallet packing scenario, and/or the like may be determined by comparing the result obtained for each test sample with a computed resource type, pallet packing scenario, and/or the like for each test sample. In general, the top-performing candidate resource types, pallet packing scenarios, and/or the like will have results that closely match the computed resource type, pallet packing scenario, and/or the like. The top-performing candidate resource types, pallet packing scenarios, and/or the like may be used for multi-sensor perception for resource tracking and quantification operations.

Figure 4:
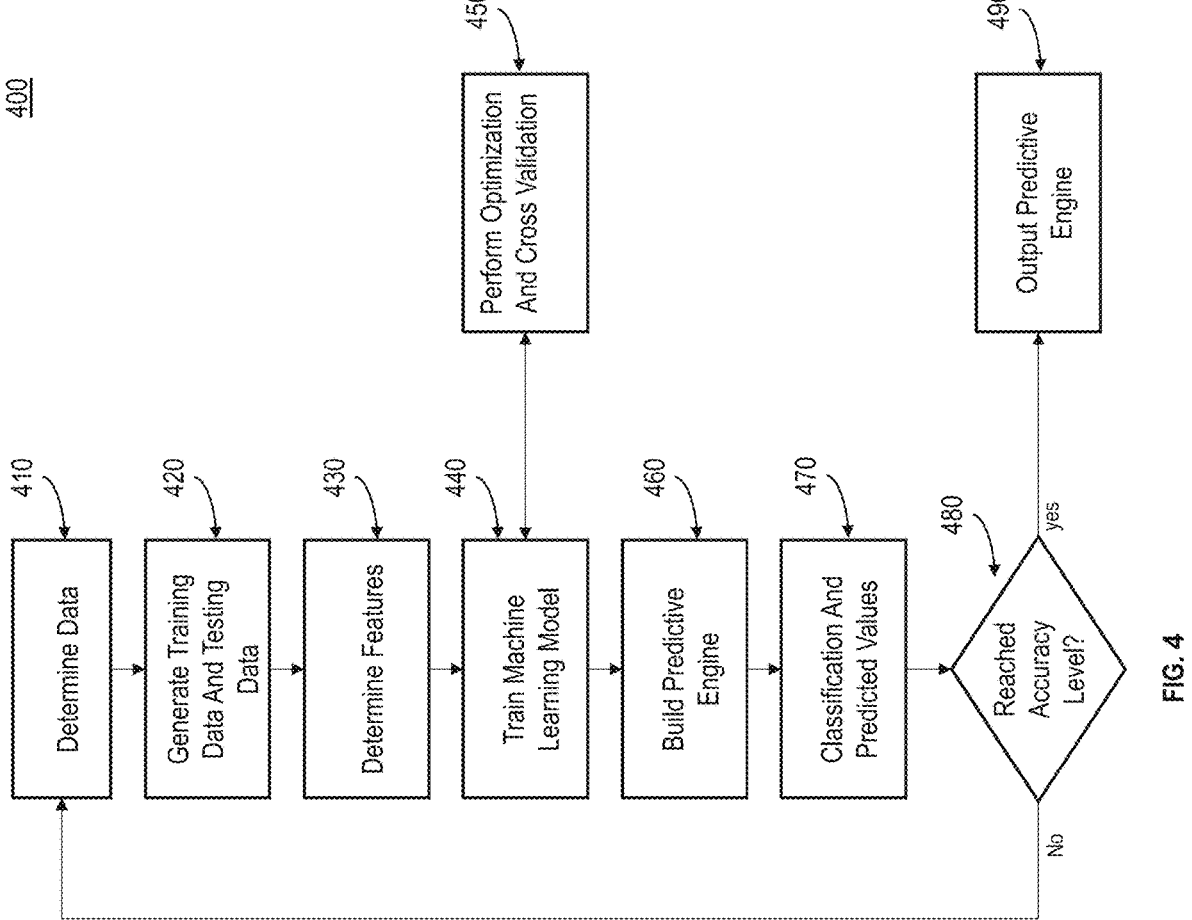
FIG. 4 shows a flowchart of an example training method for generating a machine learning classifier to classify sensor data used for multi-sensor perception for resource tracking and quantification, according to some aspects.

FIG. 4 is a flowchart illustrating an example training method 400 for generating the machine learning classifier 330 using the analysis module 112, according to some aspects. The analysis module 112 can implement supervised, unsupervised, and/or semi-supervised (e.g., reinforcement-based) machine learning-based classification models 340. The method 400 shown in FIG. 4 is an example of a supervised learning method; variations of this example of training method are discussed below, however, other training methods can be analogously implemented to train unsupervised and/or semi-supervised machine learning (predictive) models. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIGS. 1-3. However, method 400 is not limited to the aspects of those figures.

In 410, analysis module 112 determines (e.g., access, receive, retrieve, etc.) sensor data and/or resource information. The sensor data and/or resource information may contain one or more datasets, each dataset associated with a resource type, pallet packing scenario, and/or the like.

In 420, analysis module 112 generates a training dataset and a testing dataset. According to some aspects, the training dataset and the testing dataset may be generated by indicating resource types, pallet packing scenarios, and/or the like. According to some aspects, the training dataset and the testing dataset may be generated by randomly assigning resource types, pallet packing scenarios, and/or the like to either the training dataset or the testing dataset. According to some aspects, the assignment of sensor data and/or resource information as training or test samples may not be completely random. According to some aspects, only the labeled baseline data for a specific feature extracted from specific sensor data (e.g., optimized pallet packing scenarios, etc.) may be used to generate the training dataset and the testing dataset. According to some aspects, a majority of the labeled baseline data extracted from sensor data and/or resource information may be used to generate the training dataset. For example, 75% of the labeled baseline data for determining a resource type, pallet packing scenario, and/or the like extracted from the imaging data may be used to generate the training dataset and 25% may be used to generate the testing dataset. Any method or technique may be used to create the training and testing datasets.

In 430, analysis module 112 determines (e.g., extract, select, etc.) one or more features that can be used by, for example, a classifier (e.g., a software model, a classification layer of a neural network, etc.) to label features extracted from a variety of sensor data and/or resource information. One or more features may comprise indications of a resource type, pallet packing scenario, and/or the like. According to some aspects, the analysis module 112 may determine a set of training baseline features from the training dataset. Features of sensor data and/or resource information may be determined by any method.

In 440, analysis module 112 trains one or more machine learning models, for example, using the one or more features. According to some aspects, the machine learning models may be trained using supervised learning. According to some aspects, other machine learning techniques may be employed, including unsupervised learning and semi-supervised. The machine learning models trained in 440 may be selected based on different criteria (e.g., how close a predicted resource type, pallet packing scenario, and/or the like is to an actual resource type, pallet packing scenario, and/or the like) and/or data available in the training dataset. For example, machine learning classifiers can suffer from different degrees of bias. According to some aspects, more than one machine learning model can be trained.

In 450, analysis module 112 optimizes, improves, and/or cross-validates trained machine learning models. For example, data for training datasets and/or testing datasets may be updated and/or revised to include more labeled data indicating different resource types, pallet packing scenarios, and/or the like.

In 460, analysis module 112 selects one or more machine learning models to build a predictive model (e.g., a machine learning classifier, a predictive engine, etc.). The predictive model may be evaluated using the testing dataset.

In 470, analysis module 112 executes the predictive model to analyze the testing dataset and generate classification values and/or predicted values.

In 480, analysis module 112 evaluates classification values and/or predicted values output by the predictive model to determine whether such values have achieved the desired accuracy level. Performance of the predictive model may be evaluated in a number of ways based on a number of true positives, false positives, true negatives, and/or false negatives classifications of the plurality of data points indicated by the predictive model. For example, the false positives of the predictive model may refer to the number of times the predictive model incorrectly predicted and/or determined a resource type, pallet packing scenario, and/or the like. Conversely, the false negatives of the predictive model may refer to the number of times the machine learning model predicted and/or determined a resource type, pallet packing scenario, and/or the like incorrectly, when in fact, the predicted and/or determined a resource type, pallet packing scenario, and/or the like matches an actual resource type, pallet packing scenario, and/or the like. True negatives and true positives may refer to the number of times the predictive model correctly predicted and/or determined a resource type, pallet packing scenario, and/or the like. Related to these measurements are the concepts of recall and precision. Generally, recall refers to a ratio of true positives to a sum of true positives and false negatives, which quantifies the sensitivity of the predictive model. Similarly, precision refers to a ratio of true positives as a sum of true and false positives.

In 490, analysis module 112 outputs the predictive model (and/or an output of the predictive model). For example, analysis module 112 may output the predictive model when such a desired accuracy level is reached. An output of the predictive model may end the training phase.

According to some aspects, when the desired accuracy level is not reached, in 490, analysis module 112 may perform a subsequent iteration of the training method 400 starting at 410 with variations such as, for example, considering a larger collection of sensor and/or resource information.

FIG. 5 shows a flowchart of an example method 500 for multi-sensor perception for resource tracking and quantification, according to some aspects. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to FIGS. 1-4. However, method 500 is not limited to is not limited to the aspects of those figures. A computer-based system (e.g., the system 100, etc.) may facilitate multi-sensor perception for resource tracking and quantification.

In 510, computing device 102 receives resource information indicating an identifier, a resource location, and a resource amount. Resource information may include, for example, purchase order information, warehouse slot mapping information, and/or the like. For example, according to some aspects, the computing device 102 may be loaded and/or configured with purchase order information, warehouse slot mapping information, and/or the like that indicates identifiers (e.g., SKUs, UPCs, unique identifiers, etc.), locations (e.g., warehouse inventoried locations, shelves, aisles, bins, etc.), and/or amounts (e.g., purchase order amounts, stock amounts, requested amounts, etc.) for a resource and/or plurality of resources (e.g., beverages, stock/inventory resources, products, etc.). According to some aspects, the computing device 102 may receive purchase order information, warehouse slot mapping information, and/or the like that indicates identifiers, locations, and/or amounts for a resource an/or a plurality of resources from a device (e.g., a cloud-based device, a service provider device, a computing device, etc.), a network (e.g., a private network, a public network, the Internet, etc.), a system (a warehouse management system, etc.), and/or the like. The computing device 102 may receive resource information by any method or technique.

In 520, computing device 102 tracks, at the resource location, the resource removed from the resource location and placed at a predefined location. For example, the computing device 102 may track the resource removed from the resource location and placed at the predefined location based on sensor data received from a first sensing device and the resource identifier. According to some aspects, the predefined location may be on a pallet. For example, the resource may be a box, package, and/or the like of beverages (or any other product), and the computing device 102 may track the resource as it is removed from any location in a warehouse and placed on a pallet. According to some aspects, the pallet may be placed on and/or attached to a mobile unit (e.g., a pallet truck, a forklift, a stocking cart, etc.). According to some aspects, the sensing device may include one or more of a camera (e.g., stereo camera, high-definition camera, video camera, smart camera, PoE camera, etc.), a LIDAR sensor, an infrared sensor, a position detection sensor, and/or the like.

According to some aspects, computing device 102 track the resource removed from the resource location and placed at the predefined location by determining that a type of the resource corresponds to a type of resource indicated by the respective identifier. For example, computing device 102 may track the resource removed from the resource location and placed at the predefined location by determining, based on object recognition performed by a trained machine learning model, that a type of the resource corresponds to a type of resource indicated by the resource identifier. The trained machine learning model may identify, based on a correspondence between feature classification data and a feature extracted from the sensor data received from the first sensing device, a type of the resource. The trained machine learning model may identify, based on a correspondence between the type of the resource and a type of resource indicated by the resource identifier, the resource.

Computing device 102 determines, for example, based on object tracking applied to the sensor data received from the first sensing device, that the resource is placed in an area of the predefined location. For example, the trained machine learning model may determine, based on at least on a difference between a position of the resource indicated in a first image extracted from the sensor data received from the first sensing device and a position of the resource indicated in a second image extracted from the sensor data received from the first sensing device, that the resource is placed in the area of the predefined location.

According to some aspects, computing device 102 causes display, via a user interface, of an indication of the resource placed in the respective area of the predefined location. The indication of the resource placed in the respective area of the predefined location may include, for example, a value associated with the resource, an image of the resource, a graphical representation of the resource, and/or the like.

In 530, computing device 102 determines an amount of the resource removed from the resource location and placed at the predefined location. For example, computing device 102 may determine an amount of the resource of the plurality of resources removed from the resource location and placed at the predefined location based on depth information indicated by indicated by sensor data received from a second sensing device.

According to some aspects, computing device 102 determines the amount of the resource removed from the resource location and placed at the predefined location by causing display of an indication of the resource placed in an area of the predefined location that is associated with a resource type of the resource. The computing device 102, for each resource removed from the respective location, determines an amount of the resource based on a match between a respective depth value indicated by the depth information and a depth value associated with an amount of the respective resource type.

In 540, computing device 102 determines a match between the resource amount and the amount of the resource removed from the resource location and placed at the predefined location. For example, the computing device 102 may access storage storing the resource amount and determine that a value indicated by the resource amount matches/corresponds to the amount of the resource removed from the resource location and placed at the predefined location.

In 550, computing device 102 generates a notification that indicates that additional resources that match the resource should stop being removed from the resource location and placed at the predefined location. For example, computing device 102 generates the a notification that indicates that additional resources that match the resource should stop being removed from the resource location and placed at the predefined location based on a match between the resource amount and the amount of the resource removed from the resource location and placed at the predefined location. The notification may include an audible notification (e.g., text-to-speech, a recorded/computerized voice, a chime, an alarm, etc.), a text notification (e.g., a text message sent to a mobile device of a user, product/resource picker, warehouse laborer, entity, etc.), a visual notification (e.g., a notification displayed on a user interface, etc.), and/or the like. The notification may cause additional resources that match the resource to stop being removed from the resource location and placed at the predefined location, for example by an entity. According to some aspects, the notification may be an instruction that instructs an entity to stop removing additional resources that match the resource from the resource location and placing them at the predefined location. According to some aspects, the notification may indicate in real-time an amount of the additional resources that remain, for example, at the resource location, within an inventory, and/or the like.

According to some aspects, the notification may include one or more control signals that cause an entity, such as an autonomous robot/device and/or the like to stop removing additional resources that match the resource from the resource location and placing them at the predefined location.

According to some aspects, the method 500 may further include the computing device 102 generating, for a resource of the plurality of resources, based on a mismatch between the respective amount for the resource and the amount of the resource removed from the respective location and placed at the predefined location, a notification that indicates the mismatch. The notification may include an audible notification (e.g., text-to-speech, a recorded/computerized voice, a chime, an alarm, etc.), a text notification (e.g., a text message sent to a mobile device of a user, product/resource picker, warehouse laborer, entity, etc.), a visual notification (e.g., a notification displayed on a user interface, etc.), and/or the like.

Figure 6:
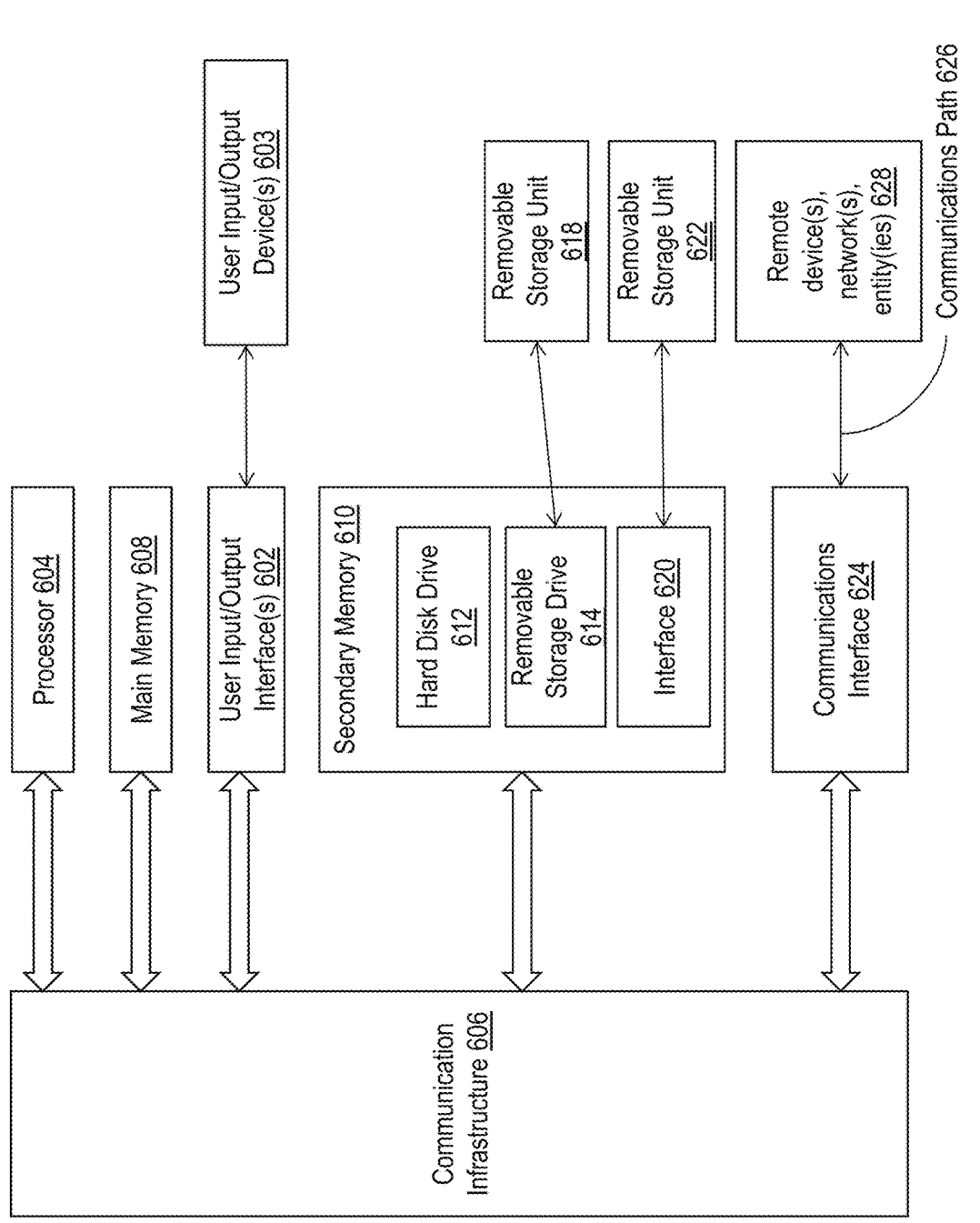
FIG. 6 shows a schematic block diagram of an exemplary computer system in which aspects described may be implemented.

FIG. 6 is an example computer system useful for implementing various embodiments. Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof. According to some aspects, the computing device 102 of FIG. 1 (and/or any other device/component described herein) may be implemented using the computer system 600. According to some aspects, the computer system 600 may be used to implement methods 400 and 500.

Computer system 600 may include one or more processors (also called central processing units, or CPUs), such as a processor 604. Processor 604 may be connected to a communication infrastructure or bus 606.

Computer system 600 may also include user input/output device(s) 602, such as monitors, keyboards, pointing devices, etc., which may communicate with communication infrastructure or bus 606 through user input/output device(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, a tape backup device, and/or any other storage device/drive.

Removable storage drive 614 may interact with a removable storage unit 618. The removable storage unit 618 may include a computer-usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to the removable storage unit 618.

Secondary memory 610 may include other means, devices, components, instrumentalities, and/or other approaches for allowing computer programs and/or other instructions and/or data to be accessed by computer system 600. Such means, devices, components, instrumentalities, and/or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, and/or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

Additionally and/or alternatively, while this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

One or more parts of the above implementations may include software. Software is a general term whose meaning of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for multi-sensor perception for resource tracking and quantification, the method comprising:

receiving resource information indicating a resource identifier, a resource location, and a resource amount;

tracking at the resource location, based on sensor data received from a first sensing device and the resource identifier, a resource removed from the resource location and placed at a predefined location, wherein the tracking comprises:

extracting, by a machine learning based classifier, a feature from a first image within the sensor data received from the first sensing device;

identifying, by the machine learning based classifier, a type of resource based on the feature;

identifying, by the machine learning based classifier, a resource based on a correspondence between the type of resource and the resource identifier;

applying a bound around the resource in the first image based on the identifying of the resource;

tracking the resource by adjusting a location of the bound around the resource in a second image in the sensor data received from the first sensing device based on the identifying of the resource; and determining, based on at least a difference between a position of the bound around the resource in the first image and a position of the bound around the resource in the second image, that the resource is placed in an area of the predefined location;

determining an amount of the resource removed from the resource location and placed at the predefined location by determining the amount of the resource in the bound around the resource in the second image using depth information indicated by sensor data received from a second sensing device;

determining a match between the resource amount and the amount of the resource removed from the resource location and placed at the predefined location; and generating, based on the match between the resource amount and the amount of the resource removed from the resource location and placed at the predefined location, a notification signal that indicates that additional resources that match the resource should stop being removed from the resource location and placed at the predefined location.

2. The method of claim 1, further comprising:

causing display of an indication of the resource placed in the area of the predefined location.

3. The method of claim 2, wherein the indication of the resource placed in the area of the predefined location comprises at least one of a value associated with the resource, an image of the resource, or a graphical representation of the resource.

4. The method of claim 1, wherein the determining the amount of the resource removed from the resource location and placed at the predefined location further comprises:

causing display of an indication of the resource placed in an area of the predefined location that is associated with a resource type of the resource; and determining, based on a match between a depth value indicated by the depth information and a depth value associated with an amount of the resource type, the amount of the resource.

5. The method of claim 1, wherein the notification signal that causes additional resources that match the resource to stop being removed from the resource location and placed at the predefined location comprises at least one of an audible notification, a text notification, or a visual notification.

6. The method of claim 1, further comprising:

generating, based on a mismatch between the resource amount and the amount of the resource removed from the resource location and placed at the predefined location, a notification signal that indicates the mismatch.

7. The method of claim 6, wherein the notification signal that indicates the mismatch comprises at least one of an audible notification, a text notification, or a visual notification.

8. A non-transitory computer-readable medium having instructions stored thereon that, when executed by at least one computing device, cause the at least one computing device to perform operations for multi-sensor perception to track locations and quantities of resources, the operations comprising:

receiving resource information indicating a resource identifier, a resource location, and a resource amount;

tracking at the resource location, based on sensor data received from a first sensing device and the resource identifier, a resource removed from the resource location and placed at a predefined location, wherein the tracking comprises:

extracting, by a machine learning based classifier, a feature from a first image within the sensor data received from the first sensing device;

identifying, by the machine learning based classifier, a type of resource based on the feature;

identifying, by the machine learning based classifier, a resource based on a correspondence between the type of resource and the resource identifier;

applying a bound around the resource in the first image based on the identifying of the resource;

tracking the resource by adjusting a location of the bound around the resource in a second image in the sensor data received from the first sensing device based on the identifying of the resource; and determining, based on at least a difference between a position of the bound around the resource in the first image and a position of the bound around the resource in the second image, that the resource is placed in an area of the predefined location;

determining an amount of the resource removed from the resource location and placed at the predefined location by determining the amount of the resource in the bound around the resource in the second image using depth information indicated by sensor data received from a second sensing device;

determining a match between the resource amount and the amount of the resource removed from the resource location and placed at the predefined location; and generating, based on the match between the resource amount and the amount of the resource removed from the resource location and placed at the predefined location, a notification signal that indicates that additional resources that match the resource should stop being removed from the resource location and placed at the predefined location.

9. The non-transitory computer-readable medium of claim 8, wherein the tracking the resource removed from resource location and placed at the predefined location further comprises:

causing display of an indication of the resource placed in the area of the predefined location.

10. The non-transitory computer-readable medium of claim 9, wherein the indication of the resource placed in the area of the predefined location comprises at least one of a value associated with the resource, an image of the resource, or a graphical representation of the resource.

11. The non-transitory computer-readable medium of claim 8, wherein the determining the amount of the resource removed from the resource location and placed at the predefined location further comprises:

causing display of an indication of the resource placed in an area of the predefined location that is associated with a resource type of the resource; and determining, based on a match between a depth value indicated by the depth information and a depth value associated with an amount of the resource type, the amount of the resource.

12. The non-transitory computer-readable medium of claim 8, wherein the notification signal that causes additional resources that match the resource to stop being removed from the resource location and placed at the predefined location comprises at least one of an audible notification, a text notification, or a visual notification.

13. The non-transitory computer-readable medium of claim 8, the operations further comprising:

generating, based on a mismatch between the resource amount and the amount of the resource removed from the resource location and placed at the predefined location, a notification that indicates the mismatch.

14. The non-transitory computer-readable medium of claim 13, wherein the notification signal that indicates the mismatch comprises at least one of an audible notification, a text notification, or a visual notification.

15. A system, comprising:

a memory; and at least one processor coupled to the memory and configured to perform operations for multi-sensor perception to track locations and quantities of resources, the operations comprising:

receiving resource information indicating a resource identifier, a resource location, and a resource amount;

tracking at the resource location, based on sensor data received from a first sensing device and the resource identifier, a resource removed from the resource location and placed at a predefined location, wherein the tracking comprises:

extracting, by a machine learning based classifier, a feature from a first image within the sensor data received from the first sensing device;

identifying, by the machine learning based classifier, a type of resource based on the feature;

identifying, by the machine learning based classifier, a resource based on a correspondence between the type of resource and the resource identifier;

applying a bound around the resource in the first image based on the identifying of the resource;

tracking the resource by adjusting a location of the bound around the resource in a second image in the sensor data received from the first sensing device based on the identifying of the resource; and determining, based on at least a difference between a position of the bound around the resource in the first image and a position of the bound around the resource in the second image, that the resource is placed in an area of the predefined location;

determining an amount of the resource removed from the resource location and placed at the predefined location by determining the amount of the resource in the bound around the resource in the second image using depth information indicated by sensor data received from a second sensing device;

determining a match between the resource amount and the amount of the resource removed from the resource location and placed at the predefined location; and generating, based on the match between the resource amount and the amount of the resource removed from the resource location and placed at the predefined location, a notification signal that indicates that additional resources that match the resource should stop being removed from the resource location and placed at the predefined location.

16. The system of claim 15, further comprising:
causing display of an indication of the resource placed in the area of the predefined location.

17. The system of claim 16, wherein the indication of the resource placed in the area of the predefined location comprises at least one of a value associated with the resource, an image of the resource, or a graphical representation of the resource.

18. The system of claim 15, wherein the determining the amount of the resource removed from the resource location and placed at the predefined location further comprises:
causing display of an indication of the resource placed in an area of the predefined location that is associated with a resource type of the resource; and
determining, based on a match between a depth value indicated by the depth information and a depth value associated with an amount of the resource type, the amount of the resource.

19. The system of claim 15, wherein the notification signal that causes additional resources that match the resource to stop being removed from the resource location and placed at the predefined location comprises at least one of an audible notification, a text notification, or a visual notification.

20. The system of claim 15, the operations further comprising:
generating, based on a mismatch between the resource amount and the amount of the resource removed from the resource location and placed at the predefined location, a notification signal that indicates the mismatch.

21. The method of claim 1, further comprising:
automatically sending, based on the notification signal, a control signal to an autonomous device to stop removing additional resources that match the resource from the resource location.

* * * * *